Dec. 27, 1966   J. G. AREDDY   3,294,306
PALLETIZED SHIPPING CONTAINER
Filed May 18, 1964   2 Sheets-Sheet 2

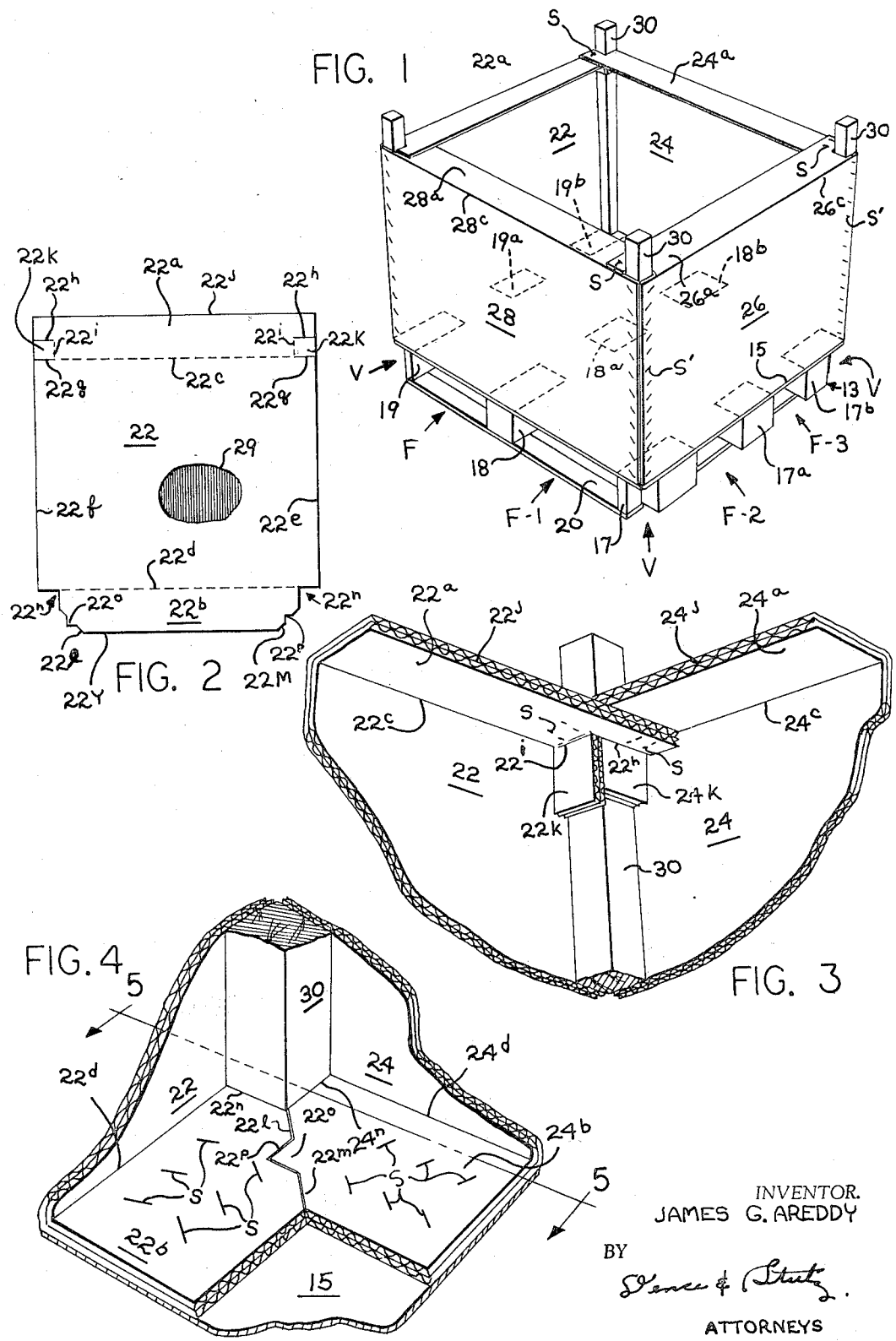

INVENTOR.
JAMES G. AREDDY
BY
ATTORNEYS

United States Patent Office 3,294,306
Patented Dec. 27, 1966

3,294,306
PALLETIZED SHIPPING CONTAINER
James G. Areddy, Toledo, Ohio, assignor to Industrial Packaging Specialists, Toledo, Ohio, a corporation of Ohio
Filed May 18, 1964, Ser. No. 367,983
10 Claims. (Cl. 229—23)

The present invention relates broadly to a shipping container suitable for containing a variety of products and items. More particularly, the present invention relates to a shipping container which is palletized. By "palletized" I mean that the shipping container is cooperatively constructed in combination with a skid or pallet designed for easy transportability.

By way of introduction, it may be stated that it is eminently desirable to store a wide variety of items or products in a shipping container which is adaptable for transportation about a manufacturing facility, as well as to and fro such a facility or the like. The products or items may be raw materials or compenents used in a manufacturing operation, or the items may constitute products of the particular manufacturing operation which are desirably temporarily stored in a container, and the container or bin being adaptable for transportation from the finish or inspection line to the dock for shipment. More commonly, the shipping containers are used in and around a manufacturing facility. Transporation in and about a particular facility is usually accomplished by means of a fork lift truck or dolly. A lift truck is a man-bearing, motorized powered unit which features forwardly projecting parallel spaced elements in the nature of fork tines which are powered for vertical movement. They are ideally adapted to pick up a skid or pallet provided with a pair of openings to receive the spaced tines or forks. The dolly is similar to the truck, but is not ridden by the operator. Since storage space is at a premium, both for raw materials and finished products, it is eminently desirable in the last analysis that the bins or containers be vertically stackable.

Accordingly, it is an object of the present invention to provide a shipping container which, together with its contents, is adapted for easy tarnsportation by a fork lift truck or dolly.

It is also an object of the present invention to provide such a shipping container which is readily stackable in vertical array with identical shipping container-pallet combinations constructed in accordance with the present invention.

It is likewise an object of this invention to provide such a shipping container which, in addition to being stackable and easily transportable by conventional lift truck or dolly, is readily constructed from relatively inexpensive materials of construction, chiefly wood and paperboard and equivalent materials.

While stackable shipping containers in and of themselves are known in the art, they are generally cumbersome, expensive constructions subject to collapse and failure for a variety of reasons. Furthermore, known units frequently fail to stack even in the first instance, due to defects in one or more components or the relative arrangement of the constructional details. Naturally, should any such defects lead to failure in stacking, very undesirable damage of products or contents is likely to occur.

It is additionally an object of the present invention to provide a shipping container in the nature of a storage bin which, by reason of novel constructional details, is capable of being vertically stacked with similarly constructed shipping containers in greater numbers than heretofore possible.

It is a particular and important object of the present invention to provide features of construction which permit the optimum in efficiency in terms of reliability of quick, easy stacking, reduction of stacking failures, convenience of use and transportability, coupled with economy of construction.

The above-enumerated objects, as well as others, will become apparent to those skilled in the art from the following detailed description taken in conjunction with the annexed sheets of drawings on which there are presented, for purposes of illustation only, several embodiments of the present invention.

In the drawings:

FIG. 1 is a generally isometric, perspective view of a palletized shipping container constructed in accordance with a preferred embodiment of the present invention.

FIG. 2 is a top plan view of a paperboard "blank" fabricated so as to constitute a side wall construction for the shipping container in accordance with a preferred embodiment of the present invention.

FIG. 3 is a somewhat enlarged perspective view of one corner, looking from the interior, of the container construction representing a preferred embodiment thereof.

FIG. 4 is a view similar to that of FIG. 3, but showing the lower corner interiorly of a container construction in accordance with a preferred embodiment of the present invention.

Figure 5:
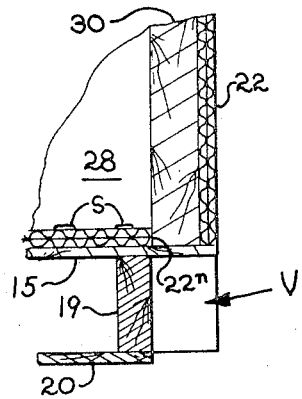
FIG. 5 is an enlarged partial sectional view taken on the line 5—5 of FIG. 4.

In its simplest embodiment, the present invention envisions a shipping container serving as a storage bin; said container including a base adapted to be engaged for elevation by the spaced forks of a lift truck; a planar platform for contents and said base being provided with downwardly facing corner voids; corner posts above said voids and means for locating said corner posts in spaced relationship, perpendicular to said platform and located for engagement by the downwardly facing corner voids of a similarly constructed shipping container.

Referring now more particularly to the drawings, there is shown in FIG. 1 a stackable shipping container 11 in accordance with the present invention. The shipping container 11 includes a base member 13 composed of a planar, horizontally disposed platform 15 having secured thereto, in spaced depending relationship, nine spacer blocks 17, 17a, 17b, 18, 18a, 18b, 19, 19a and 19b. The blocks, some of which are shown in dotted outline in FIG. 1, are located generally in three parallel rows. The blocks, located as shown, leave spaces F and F-1 at one edge and spaces F-2 and F-3 at the edge normal thereto. These spaces extend through to the opposed edges of the pallet, whereby these spaces can receive the spaced fork lift elements of a lift truck regardless of which side of the skid is approached by the operator of the lift truck. The platform components, including the plurality of blocks, are conveniently fabricated of wood, by reason of the combination of strength and economy. Cross members 20 connecting the various blocks lend rigidity to the pallet or skid which, as indicated, is composed of the platform 15 and the blocks and cross members referred to. In place of the nine blocks arranged in three rows and identified 17, 18 and 19, I can use three linear members in the nature of spaced runners. These runners are illustrated schematically in the embodiment shown in FIG. 7 and identified by reference numerals 217, 218 and 219.

It will be appreciated with the three spaced linear members that the spaces for lift truck elements are only present on two edges or sides. The nine "block" support arrangement is preferred over the three spaced runners, since the lift tuck can pick up the pallet regardless of which side is approached.

The spacer blocks at each corner are cut away at the outer corner in the manner illustrated in FIG. 1 so as to leave a plurality of voids V beneath the platform 15 and located at the four corners thereof.

The shipping container includes upstanding wall members 22, 24, 26, and 28 which are secured to the platform, as described hereinafter, and which together define, generally, a rectangular bin. Corner posts 30 located at the juncture of the side walls complete the shipping container type storage bin construction.

The upstanding side walls 22, 24 26 and 28 are formed in a preferred embodiment, of "double wall" corrugated board. "Double wall" corrugated board is generally well known in the art of paperboard. Suffice it to say that "double wall" is composed of three spaced liner sheets including, therebetween, a pair of convoluted corrugated medium sheets.

The side wall 22 is shown in "blank" planar form in FIG. 2. The other side walls 24, 26 and 28 are identically configurated. As may be seen in FIG. 2, the side wall 22 is defined by parallel lateral edges 22f and 22e. The "blank" is cut away as at 29 to show the corrugation running parallel to the lateral edges. Foldably connected to the side wall panel 22 is a top flange 22a and, similarly, foldably connected at the bottom is a bottom flange flap 22b and separated respectively from the panel 22 by foldlines 22c and 22d, respectively. Upper edge 22j and lower edge 22x, perpendicular to the lateral edges 22e and 22f, complete the perimeter of the "blank" of the side wall panel 22. The top flange 22a includes two pair of spaced slits 22g and 22h proceeding inwardly from the lateral edges 22e and 22f. The slits 22g are in alignment with the foldline 22c, while the slits 22h are spaced upwardly towards the top edge 22j. The slits 22g and 22h at each lateral edge of flange 22a are connected by a foldline 22i.

The slits 22g and 22h and the foldline 22i define a pair of foldable tongues 22k in the lateral edges of the top flange 22a and function in a manner to be described in the assembly description hereinafter. The lower flange flap 22b has contoured lateral edges defining right angle cutouts 22n and angled edges 22l on the left and 22m on the right. The edge 22l includes a triangular projection 22o, while edge 22m includes a matching notch 22p.

The configuration of the lateral edges 22l and 22m of the bottom flange segment 22b is such that when the flange 22b is folded normally to the panel 22, it will cooperatively mate with an adjoining panel such as 24, in the fashion shown in FIG. 4. Here, it can be seen that the panel 22 and the panel 24 have their associated flanges 22b and 24b folded perpendicularly towards the viewer and with the lateral edges 22l and 22m in edge-to edge registry, as it were, by reason of the mating of notch 22p and the triangular projection 22o, insuring proper positioning of the corner cutouts 22n and 24n. In this fashion, the cutouts 22n and 24n (lateral edge of bottom flange 24b) will define a cavity adapted to receive the base of a corner post 30. In place of the "blank" 22, I may utilize a "blank" having the die cut configuration shown in FIG. 9, which is identified by the reference numeral 422. The elements of this latter "blank" are identical to those of the "blank" 22 with the following exceptions. Thus, in place of tongues 22k in the lateral edges of top flap 422, I form cutouts 423 of the same contour as the flaps 22k. Additionally, the bottom flap 422b is provided with a cutout 450 along score foldline 422d and otherwise centrally located for a purpose to be described.

The panels 24, 26 and 28, as indicated, are similarly formed as the "blank" 22 in FIG. 2, and the component parts of these side walls will bear the same subscripts as described and illustrated in FIG. 2, containing the detailed description of panel 22. It will be appreciated that the side wall panels 26 and 28 are assembled with their bottom flange elements in similar disposition as that of flanges 22b and 24n, as shown in FIG. 4. These flanges are stapled by means of staples S to the upper surface of the planar platform element 15 of the pallet or skid 13. Generally, it is desirable to locate and secure to the platform 15 all of the lower flange segments 22b, 24b, 26b (not shown) and 28b (not shown). Then the side panels proper 22, 24, 26 and 28 are folded upward into upstanding relationship with the platform 15. It may be noted that the corner cutouts, for example, 22n and 24n, are directly above the corner voids V (FIG. 5) formed in the corner blocks 17, 17b, 19 and 19b. Simultaneously, the top flange members 22a, 24a, 26a and 28a are folded over into normal relationship with the panels 22, 24, 26 and 28, respectively. The foldable tongue members 22k, 24k, 26k and 28k, at each end of the respective top flanges, are then folded downwardly, generally as shown in FIG. 3, into normal relationship, both with their associated side wall and the top flange itself. The overlapped portions of the flanges are then secured by stapling. With the tongues, e.g., 22k and 24k, projecting downwardly and normal to each other, the corner posts can be inserted downwardly through the space left by the downward folding of the tongues, which supportingly abut the post 30 as it proceeds downwardly to ultimately engage the corner cutouts 22n and 24n, in which it is seated securely by abutment against the lateral edges of the bottom wall flanges. The overlapping portions of the upper flanges are, as indicated, secured by stapling, using staples S, while staples S' are next applied to the vertical marginal edges of the panels where they overlap the corner posts 30.

Figure 6:
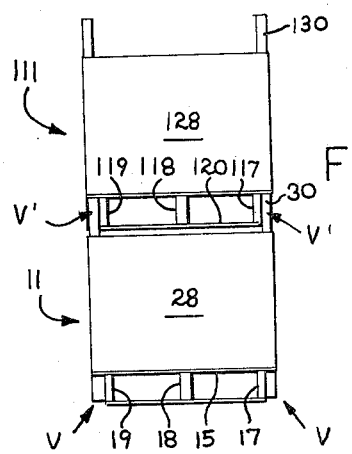
FIG. 6 is an elevation view of two shipping containers in accordance with the present invention shown in vertical stacked array.

When the stapling as described is completed, the shipping container will have assumed the erected configuration as shown in FIG. 1. The foldlines separating the top flanges from the side wall proper are so selected in relationship to the height of the corner posts that a portion of the corner posts extends upwardly beyond the flanges 22a, 24a, 26a and 28a. Since the corner posts are fixed by reason of their snug fitting with the corner cutouts, e.g., 22n and 24n (FIG. 4) in the bottom flanges and the opening defined between the foldable tongues 22k and 24k, the four posts 30 in concert are readily adapted to be engaged by voids V' in the blocks 117 and 119 (as viewed in FIG. 6) and 117b and 119b (not shown). The numerals 117 and 119 identify support blocks of a palletized shipping container 111 of identical configuration to that of bin 11 therebeneath.

Figures 8, 9:
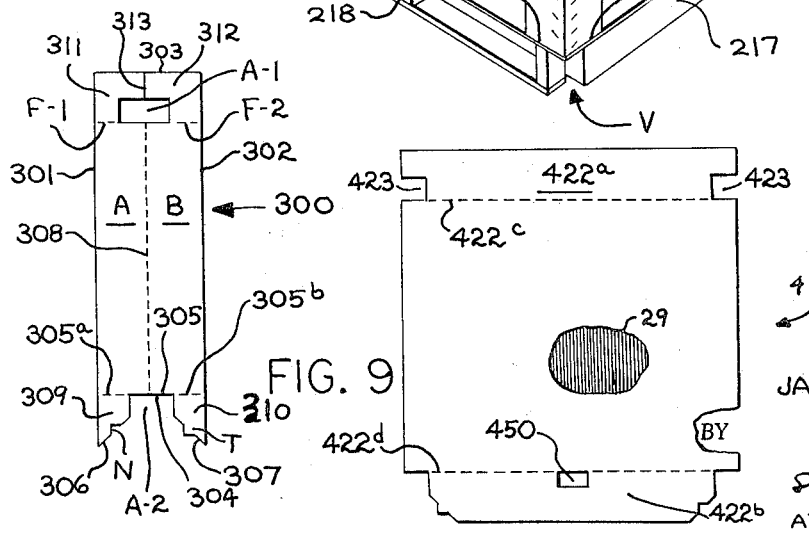
FIG. 8 is a plan view of a "blank" paperboard corner support utilized in the constructional embodiment shown in FIG. 7.
FIG. 9 is a top plan view of a paperboard "blank" fabricated to define a side wall construction representing another embodiment of the present invention.

For extremely heavy loads, it may be most desirable to employ a side wall construction in accordance with that identified as 422 in FIG. 9, together with four additional posts. With this construction, the additional posts are located midway between the corner posts. The bottoms of the posts fit down into the cavity defined by the cutout 450 along the bottom flange member 422d when such flap flange is secured to the platform. The side wall is then secured by stitching or stapling along the extent of the auxiliary post which would be shorter than the corner post. Thus, instead of extending above the top flange, it has a length corresponding to the distance between the foldline 422d and foldline 422c, whereby the top flap flange rests on the top of the post and is secured by staples. The auxiliary posts can, of course, be desirably secured, by stitching or stapling, to the "blanks" 422 in a separate operation carried out prior to the assembly with the pallet or platform member. A construction, employing the four-corner posts as well as posts of shorter height midway between each of the corner posts, yields an eight-post construction, capable of enduring extremely heavy loads. With this construction, of course, only the four-corner posts nest within the corner voids of a like shipping container bin lowered from above by a power lift truck or dolly.

The shipping container of the present invention, as illustrated in FIG. 1, is novelly constructed and adaptable to containing a variety of products. The principal vertical support is provided by the pallet 13 and the corner posts 30 which, although not physically secured to the skid 13, are positioned accurately in order that they may be received by corner voids of an identically constructed shipping container, provided that the shipping container to be stacked on top thereof includes voids V at each end of the runner elements 217 and 219 (referring to the embodiment shown in FIG. 7) or voids V in each corner block 17, 17b, 19 and 19b (referring to the embodiment shown in FIG. 1). The corner posts, as indicated hereinabove, are maintained in their corner upstanding vertical alignment by reason of the cooperative relationship of the cutouts formed in the bottom and top flanges of the side wall panel numbered 22b and 22a, respectively (reference being made to a single side wall). The engagement of the triangular projection 22o in the bottom flange at one lateral edge, with the notch 22p in an adjoining bottom flange member, insures registration of the side cuts, e.g., 22n and 24n, defining the bottom cutout or cavity in the bottom flanges formed of double wall corrugated board. Similarly, the cuts, e.g., 22h and 22g, defining foldable tongues (in cooperation with the fold 22i) insure vertical registration of the corner post 30. The overlapping of adjoining top flange portions, when stapled, lend rigidity to the ultimate bin-container construction whereby the bin can confine successfully a considerable lateral pressure by reason of the contents.

Frequently, items to be shipped, either in the nature of raw material components or finished products, do not require a side wall restraining but, at the same time, the storage areas being at a premium, it is desirable to store these materials on skids or pallets which are vertically stackable.

In accordance with the present invention, it is envisioned that a pallet bin construction 211 will be economically constructed utilizing a base 213 which is similar in construction to the base 13 shown in FIG. 1, excepting for employment of runners 217, 218 and 219 instead of "blocks." All other components of this base 213 will bear identical numbers as the base 13, but will be identified by the prefix 2. Thus, the platform 215 conforms to the platform 15 of skid 13 of FIG. 1.

Figure 7:
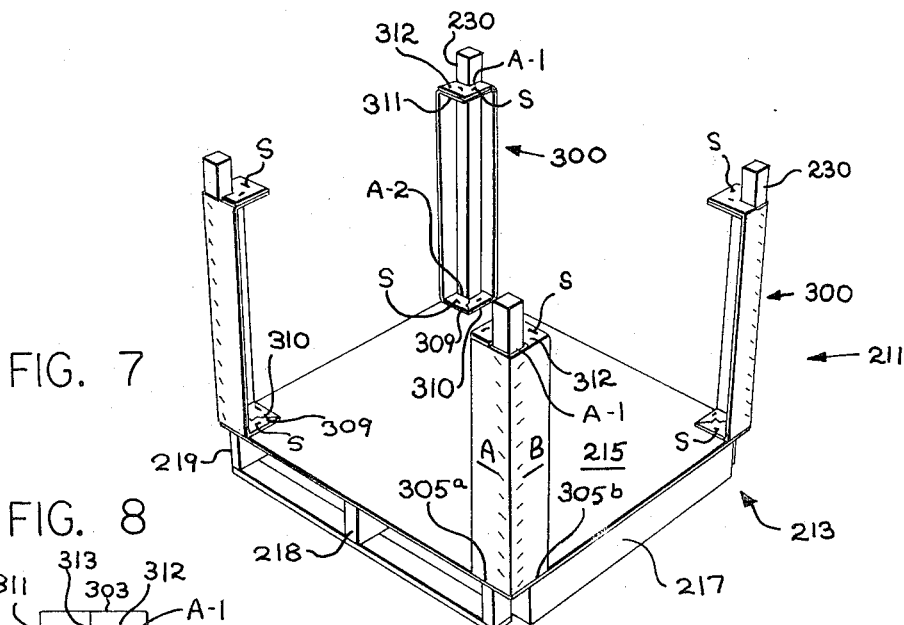
FIG. 7 is a generally isometric, perspective view, generally similar to that of FIG. 1, but illustrating a variant embodiment of the container construction in accordance with the present invention.

In this embodiment, the four corner posts 230 are maintained in their vertical, upstanding, registered spaced relationship by reason of a support member 300, which is shown in planar "blank" form in FIG. 8. It is generally rectangular, defined by parallel spaced side edges 301 and 302, top edge 303 and bottom edge 304. The latter includes a central horizontal segment 305 which separates inwardly facing angular edges 306 and 307. The edges 306 and 307 include a notch N and tab T, respectively similar to those in the bottom flange of the side walls 22, 24, 26 and 28. A vertical score foldline 308 spaced equally from the side edges 301 and 302 divides the "blank" into panels A and B while foldline 305a and 305b in line with edge 305 defines depending flaps 309 and 310 attached, respectively, to panels A and B. When the "blank" 300 is folded about foldline 308 bringing panels A and B into perpendicular relationship and the flaps 309 and 310 are folded into normal relationship with panels A and B, the edges 306 and 307 will matingly engage, aided by the notch N and tab T, as particularly shown in FIG. 7. The flaps 309 and 310 will then define a cavity A-2 by reason of the spacing due to edge 305. Also attached to panels A and B at the upper extremity are flaps 311 and 312, respectively. Each is foldably connected to the associated panels A and B and separated by foldlines F-1 and F-2. Flaps 311 and 312, separated by a slit 313 in alignment with the foldline 308, are L-shaped and positioned oppositely as to define a central rectangular aperture A-1, one edge of which is common with the foldlines F-1 and F-2. With this description, suffice it to say that the "blank" 300 can be folded on the foldline 308 and, at the same time, along the lower edge 305, whereupon the edges 306 and 307 of flaps 309 and 310 mate by registration of the tongue T and the notch N. Similarly, the upper flaps 311 and 312 are folded normally into overlapping relationship, whereupon the aperture A-1 registers with cavity A-2. The flaps 309 and 310, when folded perpendicularly to panels A and B, are stapled, as at S, to the platform 215 at each corner directly above the corner voids V formed in the opposed ends of runners 117 and 119. The aperture A-1 and cavity A-2 are in vertical registration and adapted to receive in each instance, at each corner, post 230. By reason of the construction as just described, there will be provided a pallet 213 having upstanding corner posts 230 as shown in FIG. 7. The posts themselves and the supports 300 are fabricated in such fashion that the ends of the posts 230 project above the flange flaps 311 and 312 whereby, aided by the trueness of location provided by supports 300, they will fit within four corner voids V formed in a like construction. The pallet 213 with the support posts 230, when stacked with a like pallet, will have a similar appearance to that of the pallets 111 and 11 shown in FIG. 6, excepting that the side walls 28 and 128 will be absent.

In some instances, it may be desirable to have the side walls formed of a single "blank," in which case the "blank" would comprise side-by-side serially connected side wall panels separated by foldlines. Each panel would include top and bottom flaps foldably connected thereto. With this construction, the connected panels would define a tube when the edges of the opposed panels were brought together. In consideration of the commercial corrugating practice, the single "blank" would not include tongues 22k, but rather the lateral edges of the top flaps would be cut into a corner cut defined, for example, by a cut 22g and a cut along the foldline 22i proceeding outwardly to the edge 22j.

Referring to the structure shown in FIG. 7, it will be appreciated this structure may have combined therewith restraining side wall panels secured to the supports 300 and/or posts 230.

It is within the purview of the present invention to augment post location and registration by forming cavities in the upper surface of the platform. This requires another cutting operation, however, and need only be considered in extreme situations. Thus, the location and registration of the corner posts by the cavities and apertures defined by the cutouts in the bottom and top flanges (constituting double wall corrugated board) has proven eminently satisfactory.

Broadly speaking, the pallet construction and the shipping container as provided herein may be fabricated of a variety of materials including masonite, plastic, wood, metal, etc. From the overall point of view, though, having in mind economy and ready erectability, the skid or pallet member is desirably fabricated of wood so as to be easily engageable by staples, while the side walls are desirably formed of double wall corrugated board since this material is desirable in combining easy erectability, low cost and maximum strength.

Having the foregoing in mind, it will be appreciated that modifications may be resorted to without violating the spirit and scope of the present invention and it is intended to include all such obvious variants unless to do so would be violative of the scope of the appended claims.

I claim:

1. A shipping container comprising a rigid base, side walls and support posts; said base including downwardly facing notches at each corner; said side walls including connected bottom and top flange portions; said bottom flanges flushly connecting with the upper surface of said base; said bottom flanges including lateral ends contoured to define, with the adjacent end of the adjacent flange, corner cavities receptive of said support posts; said top flanges including lateral ends contoured to define corner voids receptive of said support posts; said support posts being positioned upstandingly at said corners and embraced by said bottom flange and top flange end voids; said corner posts projecting above said top flanges and being receivable in corresponding notches in the underside of a container of like construction.

2. A shipping container comprising a base, marginal walls and support posts; said base including a planar platform and a plurality of support members secured dependingly beneath said platform; said support members including one at each corner of said platform which contains a downwardly facing notch; said wall including connected bottom and top flanges; said bottom flanges flushly connecting with the upper surface of said platform; said bottom flanges including lateral ends contoured to define, with the adjacent end of the adjacent flange, corner cavities receptive of the support posts; said top flanges including lateral ends contoured to define corner voids receptive of the support posts; said support posts being positioned upstandingly at said corners and embraced by said bottom flange and top flange end voids; said walls being secured to said corner posts along vertical margins of said walls; said corner posts projecting above said top flanges and being receivable in corresponding notches in the underside of a like container.

3. A shipping container characterized by light weight, easy erectability, stackability with like containers, high stack strength and low cost; said container comprising a rigid base, marginal side walls and support posts; said base including a planar platform of generally rectangular configuration and a plurality of support members depending along opposite marginal edges of said platform; said members beneath corners of said platform including downwardly facing notches; said side walls including connected bottom and top flange portions; said bottom flanges flushly connecting with the upper surface of said platform; said bottom flanges including ends contoured to define, with the adjacent end of the adjacent flange, corner cavities receptive of the support posts; said top flanges including lateral ends contoured to define corner voids receptive of the support posts; said support posts being positioned upstandingly at said corners and embraced by said bottom flange and top flange end voids; said walls being secured to said corner posts along vertical margins of said walls; said corner posts projecting above said top flanges and being receivable in corresponding notches in the underside of a like container.

4. A shipping container construction adapted for vertical stacking with containers of like construction; said shipping container comprising a base, corner posts and positioning means for said posts; said base including a generally planar platform, means defining passageways beneath said platform for entry of fork elements of a lift truck and support members beneath said platform; said support members generally underlying the corners of said platform and including downwardly facing voids defining a first cavity at each corner; said positioning means comprising an elongate upstanding frame for each corner, each of said frames including top flange means defining an opening supportingly receptive of one of said support posts, and each of said frames including bottom flange means secured to said base and defining a second cavity supportingly receptive of one of said support posts; said first cavity, opening and second cavity at each corner being vertically disposed on an axis normal to the platform; said just-named elements cooperating to locate corner posts vertically at each corner and said first cavity in each corner being receptive of a corner post in a like container construction.

5. A shipping container bin construction comprising a rigid base of generally rectangular configuration; said base having spaced blocks along the marginal edges of said base; said blocks located in the corners having downwardly facing notches, side walls having bottom flanges flushly abutting and connecting with the upper surface of said base; said flanges including ends contoured to define cutouts at each corner and rigid corner posts vertically upstanding from said base; said posts being received in said cutouts in said flanges; said posts projecting upwardly above the upper edge of said side walls; said side walls including flanges at said upper edges; said flanges including ends each provided with a notch supportingly embracing a corresponding post; said bin being stackable on a like bin by positioning said upper bin with its downwardly facing notches to receive said corner posts of the lower bin.

6. A storage bin comprising a rigid base of generally rectangular configuration; said base having spaced depending runners along two marginal edges of said base; said runners having downwardly facing notches in each end constituting the corners of said base, side walls having bottom flanges flushly connecting with the upper surface of said base; said flanges including ends contoured to define cutouts at each corner above said notches and rigid corner posts vertically upstanding from said base; said posts being received in said cutouts in said flanges and being secured to marginal edges of said walls; said posts projecting upwardly above the upper edge of said side walls; said side walls including flanges at said upper edges; said flanges including ends each provided with spaced cuts defining a tongue supportingly abutting a corner post; said cuts also defining a cut away at each flange end which cooperatively receives said corner post; said bin being stackable on a like bin by positioning said upper bin with its downwardly facing notches to receive said corner posts of the lower bin.

7. A shipping container comprising a base, means on said base engageable with lift truck forks; said base having downwardly facing notches formed at each corner, side walls connected to said base, corner posts upstanding from said base above said notches and horizontal flange means on said side walls having end extremities holding said support posts vertically disposed.

8. A shipping container as claimed in claim 7, wherein said container includes side walls formed of relatively stiff, sheet-like material and said side walls include foldably connected flange flaps along an upper edge; said flange flap ends being contoured to cooperatively define a corner aperture abuttingly receptive of said corner post.

9. A shipping container as claimed in claim 7, wherein said side walls include foldably connected flange flaps along the bottom edge, means securing said flanges to the upper surface of said base; said flange flaps having lateral edges cooperatively forming, with adjacent lateral edges, corner voids receptive of the base of said corner posts.

10. A palletized shipping container comprising:
   a rectangular base formed of wood, said base having lateral openings for engaging the fork members of a lift truck and having downwardly facing notches at each corner, wooden corner posts located in vertical disposition at each corner of said base directly above said notches, upstanding side walls formed of corrugated board located about the perimeter of said base and being connected to said corner posts and flanges formed on each of said side walls, said flanges having end extremities which define the proper location of and vertical disposition of said posts.

References Cited by the Examiner
UNITED STATES PATENTS

| | | | |
|---|---|---|---|
| 2,779,360 | 12/1956 | Phillips | 108—55 X |
| 2,807,401 | 9/1957 | Smith | 229—6 |
| 2,844,344 | 7/1958 | Streb et al. | 108—53 |

GEORGE O. RALSTON, *Primary Examiner.*

JOSEPH A. LECLAIR, *Examiner.*

R. PESHOCK, *Assistant Examiner.*